United States Patent [19]

Lowe

[11] 4,223,665
[45] Sep. 23, 1980

[54] SOLAR HEATING SYSTEM

[75] Inventor: Leonard A. Lowe, Euclid, Ohio

[73] Assignee: Stellar Industries, Inc., Mentor, Ohio

[21] Appl. No.: 776,874

[22] Filed: Mar. 11, 1977

[51] Int. Cl.² ............................................. F24J 3/02
[52] U.S. Cl. .................................... 126/449; 126/417
[58] Field of Search ............... 126/270, 271, 428, 438, 126/439, 446, 449, 450, 417; 237/1 A

[56] References Cited

U.S. PATENT DOCUMENTS

| | | | |
|---|---|---|---|
| 3,863,621 | 2/1975 | Schoenfelder | 237/1 A X |
| 3,894,685 | 7/1975 | Keyes et al. | 126/270 X |
| 3,985,116 | 10/1976 | Kapany | 126/271 |
| 4,029,258 | 6/1977 | Groth | 237/1 A |
| 4,030,477 | 6/1977 | Smith | 126/271 |
| 4,055,163 | 10/1977 | Costells et al. | 126/271 |
| 4,059,094 | 11/1977 | Barrio de Mendoza | 126/271 |
| 4,080,221 | 3/1978 | Manelas | 237/1 A |
| 4,106,479 | 8/1978 | Rogers | 126/271 X |
| 4,117,831 | 10/1978 | Bansal et al. | 165/170 X |

FOREIGN PATENT DOCUMENTS 2609091  9/1976  Fed. Rep. of Germany ........... 126/271

Primary Examiner—Carroll B. Dority, Jr.
Assistant Examiner—Larry Jones

[57] ABSTRACT

A solar energy collector unit includes an air heating chamber including an insulating cover which transmits solar energy and an array of solar energy collectors spaced from the insulating cover. Each solar energy collector is formed by a tubular member having good heat transfer characteristics between its inner and outer surfaces. An opening in each collector faces the insulating cover so that solar energy transmited through the insulating cover impinges on the inner surface of the collector and serves to heat the collector's inner surface, and the heat is then quickly transferred to the collector's outer surface. Air is directed into and through the air heating chamber and into contact with the outer surface portions of the tubular members to effect heating of the major volume of air without bringing the heated air into contact with the relatively cold underside of the insulating cover.

The array of tubular members are preferably disposed with their outer surface portions spaced apart and defining an air flow passage for enabling free flow of air therearound and through the air heating chamber. The air is directed into and through the air heating chamber by means of an air inlet which directs cool air into the air heating chamber in a plane that intersects the outer surfaces of the tubular members and which plane is spaced apart from the insulating cover, and further by means of an air outlet which directs heated air from the air heating chamber and in a plane which intersects the outer surfaces of the tubular member and which plane is also spaced from the cover.

1 Claim, 5 Drawing Figures

SOLAR HEATING SYSTEM

BACKGROUND OF THE INVENTION

This application relates to an apparatus for heating a structure such as a dwelling, and particularly to an apparatus for heating a structure by means of solar energy.

There has been considerable concern that conventional sources of energy for heating dwellings will not be suitable for meeting with future demands, because of the scarcity of the raw materials needed to generate such energy, and because of the greatly increased expense which new exploration for sources of those raw materials is expected to result. There has therefore been a considerable demand for alternate sources of heating energy, and particularly alternate source of heating energy which makes use of a readily available energy source, solar energy. In fact, there are many who believe that solar energy represents the only practical long range solution to the present energy crisis.

In recent years there have been numerous and varied types of solar powered heating systems suggested.

One such system is disclosed in U.S. Pat. No. 3,894,685. According to this patent a series of cylindrically shaped heat collectors are disposed to absorb solar energy. A flow of air is then directed over the exposed outer cylindrical ends of these collectors and thereby transfers heat from the collectors to the air. In this system, the flow of air passes between the open ends of the collectors and the underside of the heat insulating cover structure and minimal air passes into contact with the outer walls of the collectors.

In addition to the system of U.S. Pat. No. 3,894,685, various other types of systems have been suggested in which a flow of air is passed over respective surfaces of the solar energy collectors and between the solar energy collectors and the insulating cover without being directed into contact with the solar energy collector. Heated air from the collectors is thus free to radiate into contact with the underside of the insulating cover. Heated air in contact with the insulating cover serves to transfer at least a portion of its heat energy thereto, and such heat energy is thereby lost from the heating system and is therefore not available for heating the structure.

In addition, in systems where the primary air flow is directed between the solar energy collector and the insulating cover it is possible for particulate matter in the air (such as dust, for example) to be deposited on the surface of the solar energy collector. A build-up of such particulate matter may ultimately impair the efficiency of the system.

SUMMARY OF THE INVENTION

The present invention provides an improved system for collecting solar energy and for transferring the heat energy generated thereby to a moving flow of air. The present invention is believed to provide a system which is extremely efficient in the manner in which it provides for collecting solar energy and for transferring heat generated thereby to a moving flow of air. At the same time the system of the present invention is believed to minimize, if not totally avoid, the types of thermal inefficiencies which may be associated with systems which operate in accordance with the types of prior art systems described above.

According to one aspect of the invention a solar energy collector unit includes an air heating chamber including an insulating cover which transmits solar energy and an array of solar energy collectors spaced from the insulating cover. Each solar energy collector is formed by a tubular member having good heat transfer characteristics between its inner and outer surfaces. An opening in each collector faces the insulating cover so that solar energy transmitted through the insulating cover impinges on the inner surface of the collector and serves to heat the collector's inner surface, and the heat is then quickly transferred to the collector's outer surface. Air is directed into and through the air heating chamber and into contact with the outer surface portions of the tubular members to effect heating of the major volume of air without bringing the heated air into contact with the relatively cold underside of the insulating cover.

The array of tubular members are preferably disposed with their outer surface portions spaced apart and defining an air flow passage for enabling free flow of air therearound and through the air heating chamber. The air is directed into and through the air heating chamber by means of an air inlet which directs cool air into the air heating chamber in a plane that intersects the outer surfaces of the tubular members and which plane is spaced apart from the insulating cover, and further by means of an air outlet which directs heated air from the air heating chamber and in a plane which intersects the outer surfaces of the tubular member and which plane is also spaced from the cover.

In another aspect of the invention the heat collectors are preferably conically shaped, and are disposed with their openings spaced from the insulating cover, and with their respective inner and outer surfaces converging away from the insulating cover. The array of conically shaped inner surfaces are extremely efficient for absorbing substantial solar radiation as the sun moves relative to the collector. Moreover, the array of conical outer surfaces form an extremely efficient air flow passage which allows free flow of air through the air heating chamber. This serves to take advantage of the heat transmitting capabilities of substantially all of the conical collectors, and also serves to maintain a substantial portion of air flowing between the collectors out of contact with the underside of the insulating cover.

BRIEF DESCRIPTION OF THE DRAWINGS

The further objects and advantages of the present invention will become further apparent from the following detailed description taken with reference to the accompanying drawings wherein.

DETAILED DESCRIPTION OF THE PREFERRED EMBODIMENT

As noted above the present invention relates primarily to apparatus which collects solar energy and which transfers heat generated by the solar energy to a moving stream of air for effecting heating a structure such as a dwelling. In the description which follows the principles of the present invention are described more fully as they would be employed in a solar heating system for heating a dwelling. The manner in which the principles of the present invention can be employed in numerous comparable other structures will become readily apparent to those of ordinary skill in the art.

Figure 2:
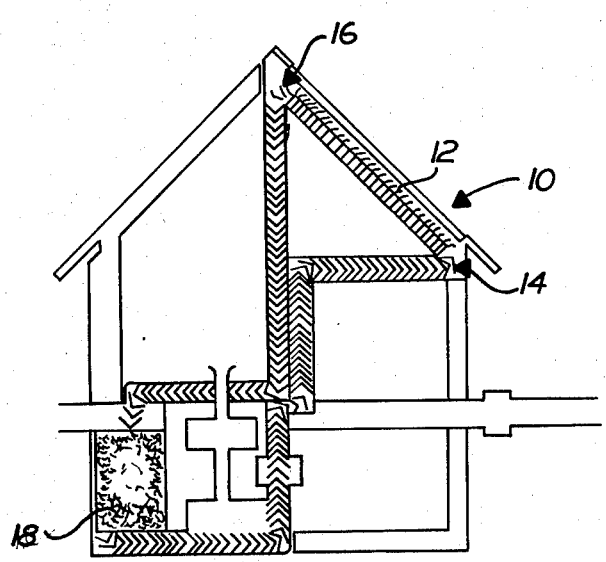
FIG. 2 is a schematic view of a building and a schematic illustration of the general air flow characteristics of a solar heating system.

FIG. 2 illustrates the general principles upon which a solar heating system operates to heat a dwelling. A solar energy collector unit 10 designed in accordance with the principles of the present invention includes an air heating chamber 12 in which heat is generated during periods of exposure of the solar energy collector unit 10 to the sun. A flow of cool air is directed into the air heating chamber 12 through an inlet 14 and heated air drawn out of the outlet end 16 of the heat collector unit. The heated air may be directed to a storage unit 18 of known construction (for example, a mass of dry rock encased by an insulating housing). Air drawn from the storage unit 18 is directed toward the inlet 14 of the air heating chamber.

During daylight hours air can be circulated between the solar collecting unit 10 and the storage unit 18 in the manner set forth above to transfer heat energy to the storage unit. In order to heat the dwelling during daylight hours, air which is heated by the collector unit 10, is circulated through desired portions of the dwelling and cold air is returned to the collector unit 10. This is effected in a known manner.

The insulating cover 19 is exposed to ambient sunlight, and serves to transmit solar energy therethrough. The insulating cover may be of a known construction, and may be formed in any manner which allows transmission of solar energy therethrough and which resists loss of heat energy therethrough. Many known types of solar heating units employ one or more spaced sheets of glass to form an insulating cover. Applicant has further found that spaced sheets of fiberglass reinforced plastic bonded to an Aluminum core can be employed to form a satisfactory insulating cover.

The insulating cover 19 thus encloses the air heating chamber 12, and an array of solar energy collectors 20 are disposed in the air heating chamber. Each solar energy collector 20 is formed of heat conducting material, and according to the preferred embodiment, each solar energy collector 20 is formed of Aluminum. Each solar energy collector 20 includes an opening 26 which faces, and is preferably spaced from the underside 28 of the insulating cover 19. Solar energy which is transmitted through the insulating cover is also transmitted through the openings 26 in the solar energy collectors and impinges on the inner surfaces 30 of the respective solar energy collectors.

According to the preferred embodiment each solar energy collector is generally tubular, and is preferably conically shaped. The collectors are disposed so that both their inner surfaces 30 and their respective outer surfaces 32 converge away from the insulating cover 19. An array of conically shaped heat collectors provide substantial surface area for exposure to ambient solar energy for a given size heating chamber.

Solar energy impinging on the inner surface 30 of a solar energy collector is effectively "absorbed" thereby and results in generation of heat energy in the solar energy collector. Maximum heat energy is absorbed by a surface which is perpendicular to an incident ray of sunlight, and the array of converging solar energy collectors of the present invention allows substantial surface portions of the energy collectors to at least approach a perpendicular orientation to the incident rays during the changes of position of the sun relative to the array of energy collectors during an entire day. The use of an array of conical solar energy collectors also provides great latitude in mounting the collector unit relative to a frame of reference attached to the earth.

In addition, the converging inner surfaces of the solar energy collectors means sunlight which is reflected by a collector is initially reflected toward the narrow end of the collector, and is thereafter reflected many times by the inner wall of the collector, and this further enhances the energy absorption of the collector. It is contemplated that if desired any known blackening agent or process may be employed to further enhance the absorption characteristics of the inner surfaces of the solar energy collectors.

It has been found that particularly good solar energy absorption characteristics can be obtained with conically shaped solar energy collectors having the following proportions: a diameter of 5 inches at the relatively wide opening 26; inner and outer walls which converge at an angle of approximately 57° to a relatively narrow end 34 having a diameter of 1 inch; and a height of 3 inches between the narrow end 34 and the widest portion of the opening 26.

The narrow ends 34 of the solar energy collectors are fixedly connected to backing sheet 36 having a surface 38 of reflective material. In turn, the backing sheet is connected with a support member 41 (preferably wood) which is connected with the dwelling roof structure.

Figure 3:
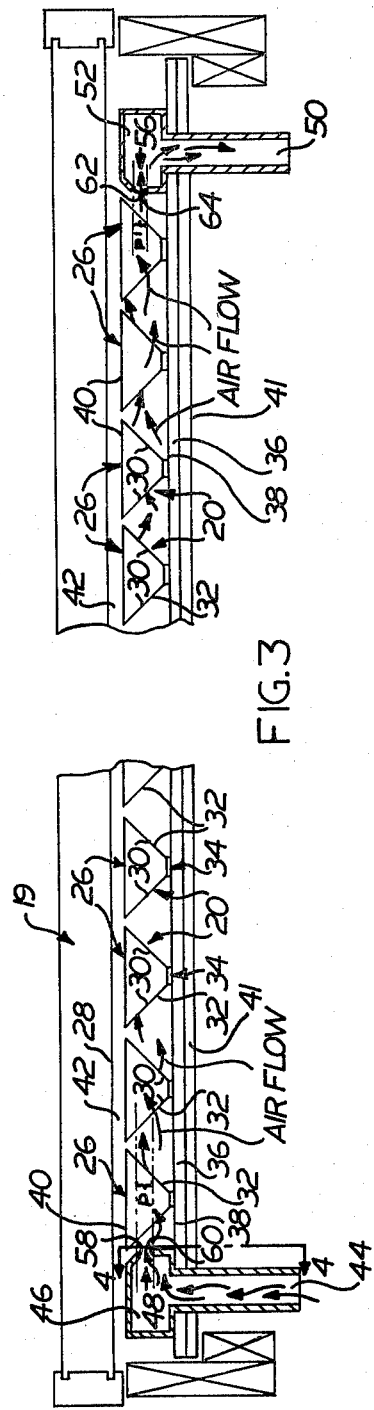
FIG. 3 is a sectional view of a portion of the solar heating system of FIG. 1, taken from approximately the direction 3—3 with portions broken away and portions omitted.

As seen in FIG. 3 the surfaces 40 defining the widest ends of the solar energy collectors all lie in a substantially common plane which is spaced from the underside 28 of the insulating cover. This results in a space 42 between the array of solar energy collectors and the insulating cover 20.

Figure 1:
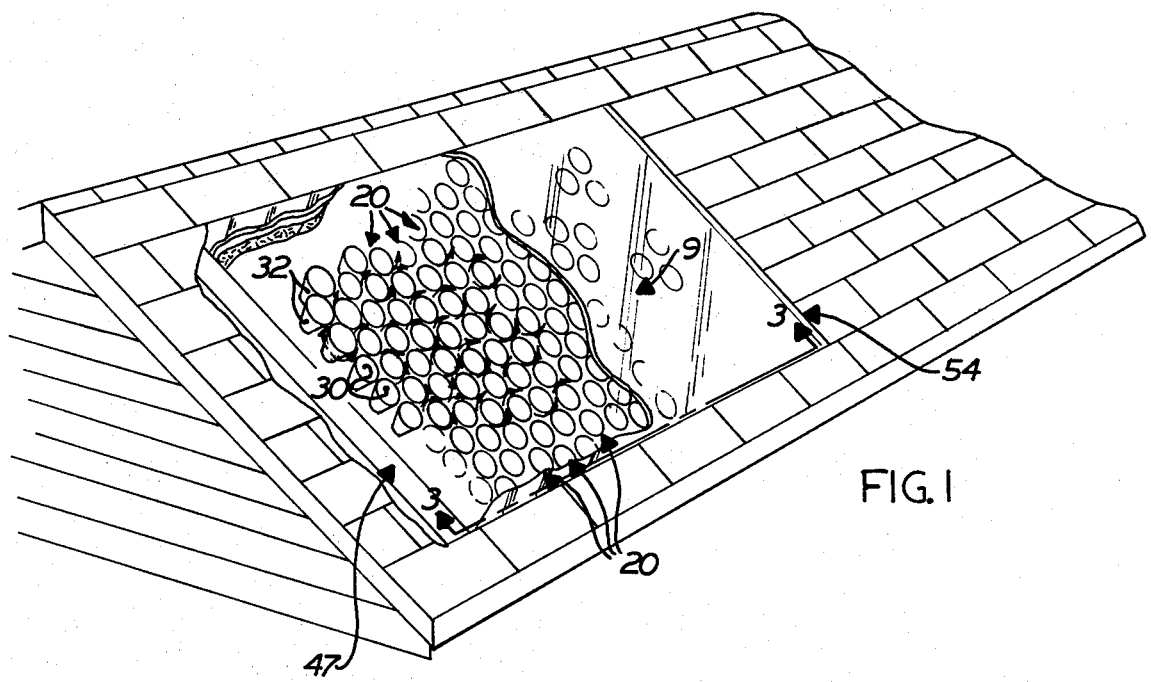
FIG. 1 is a perspective view, with portions broken away, of a building roof including a portion of a solar heating system constructed according to the principles of the present invention.
Figure 5:
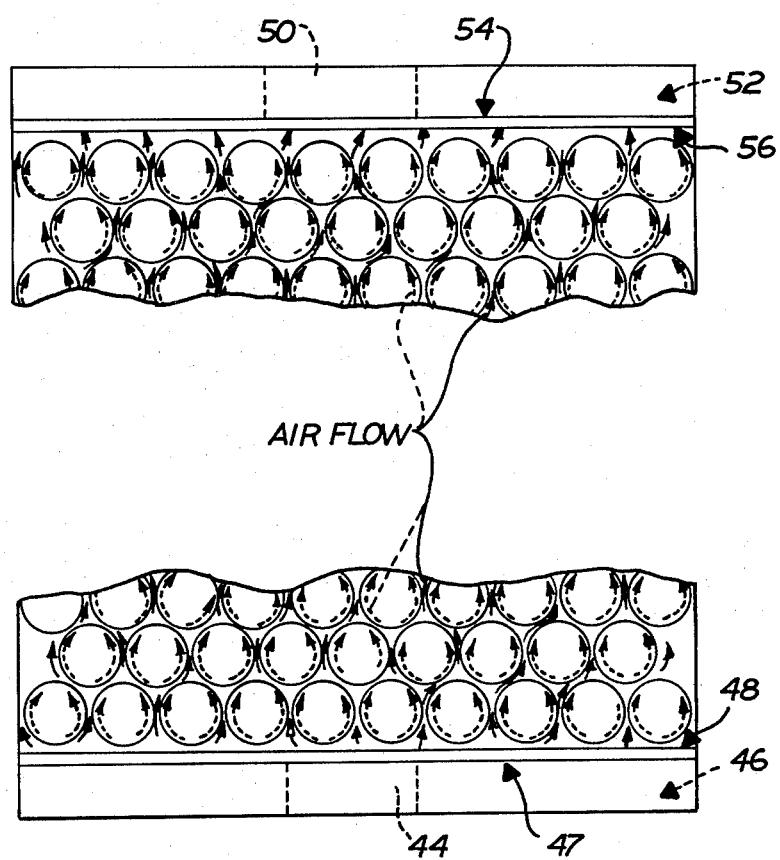
FIG. 5 is a schematic top view of a solar heating system constructed according to the invention and illustrating the air flow characteristics of the system.

As seen in FIGS. 1 and 5 the array of solar energy collectors 20 are disposed in rows, with each row being offset with respect to the rows of solar energy collectors disposed on either side of it. The rows of solar energy collectors are disposed so that the end surfaces 40 defining the widest ends of the collectors are extremely close to the respective end surfaces 40 of all adjacent collectors.

With the foregoing collector structure, and with the foregoing disposition of the array of collectors, the outer surfaces 32 of the array of collectors are spaced apart and define an air flow passage therearound. Air can flow freely around the outer surfaces 32 as it flows through the air heating chamber.

Figure 4:
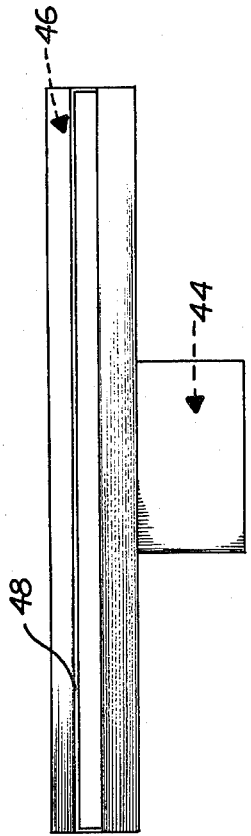
FIG. 4 is a view of the system of FIG. 3, taken from approximately the direction 4—4.

The present invention provides for directing air flow into and through the air heating chamber and into contact with the outer surfaces 32 of the solar energy collectors for effecting heating of the major volume of air flowing through the air heating chamber. Referring to FIGS. 3–5, an air inlet duct 44 is in fluid communication with cold air which is to be circulated through the air heating chamber. Inlet duct 44 is in fluid communication with an elongated air plenum 46 which extends along one entire side 47 of the air heating chamber (which is preferably rectangular). A narrow fluid flow passage 48 extends through the plenum along the entire length of the plenum 46, and passage 48 is disposed between the wide and narrow ends of the conical solar energy collectors (see particularly FIG. 3).

An air outlet duct 50 which directs heated air away from the air heating chamber is in fluid communication with another plenum 52 extending along the entire length of the opposite side 54 of the air heating chamber. A narrow fluid flow passage 56 extends through the plenum 52 along the entire length of the plenum, and passage 56 is also disposed between the wide and narrow ends of the conical solar energy collectors (FIG. 3).

Air which is introduced from duct 44 into plenum 46 is directed through passage 48 at an increased velocity. The air is directed into the air heating chamber in a plane P defined basically by the upper and lower surfaces 58,60 which define passage 48. Heated air exits the air heating chamber in a plane $P^1$ defined basically by the upper and lower surfaces 62, 64 which define the passage 56. As seen in FIG. 3, planes P and $P^1$ intersect the outer surfaces 32 of the solar energy collectors and are disposed between the wide and narrow ends of the conical solar energy collectors.

The air which is introduced into the air heating chamber is thus directed around the outer surfaces 32 of the solar energy collectors. These outer surfaces have substantial heat transmitted thereto (from the inner surfaces 30) and as the air flows therearound substantial heat is imparted to the flowing air. The passages 48 and 56 direct air flow across the entire width of the array of solar energy collectors and this is believed to enhance efficiency of the system by insuring that air flows around essentially all of the solar energy collectors.

The converging shape of the collectors, the close positioning of their widest surfaces, and the disposition of the air passages 48 and 56 serves to maintain the flow of air substantially between the ends 34, 40 of the conical collectors, and effectively creates and maintains a dead air space in the space 42 between the collectors and the underside of the insulating cover. Also, the maintenance of the air flow path essentially spaced from the insulating cover 19, and preferably below the wide ends 40 of the conical collectors, serves to minimize the likelihood of particulate matter in the flowing air from being deposited upon the inner surfaces 30 of the collectors.

Thus, according to the foregoing disclosure there has been provided an extremely efficient system for collecting solar energy, and for transferring heat energy generated thereby to a moving flow of air. With the foregoing disclosure in mind, obvious modifications of the disclosed apparatus will become readily apparent to those of ordinary skill in the art.

What is claimed is:

1. Apparatus for heating air comprising a solar energy collector unit including means defining an air heating chamber having an insulating cover which is positioned to face the sun and transmit solar energy therethrough, an array of solar energy collectors in said air heating chamber, said air heating chamber having an inlet side and an outlet side, said array of solar energy collectors extending axially between said inlet and outlet sides of said chamber and also extending transverse to the inlet and outlet sides of said chamber so that said array has a length extending between the inlet and outlet sides and a width extending between the inlet and outlet sides, each of said solar energy collectors comprising a conical member formed of heat conducting material, each conical member converging away from an open end which faces the insulating cover into which rays transmitted through the insulating cover can pass each conical member having an inner heat absorbent surface, the open ends of said conical members being generally disposed in a common plate which is spaced apart from said insulating cover, the open ends of said conical members being closely spaced with each other to define at least part of one side of an air heating plane which is spaced from said insulating cover, said conical members having conical outer surface portions which are disposed in said air heating plane in spaced apart relation with each other, said outer surface portions converging away from their respective open ends and away from said insulating cover to define an air flow passage therearound between said inlet and outlet sides of said chamber across the width thereof for enabling free flow of air therearound and through said air heating plane, means for circulating air through said air heating chamber including air inlet means having an air inlet opening through which cold air is forced into said air heating chamber and air outlet means having an air outlet opening through which heated air is drawn out of said air heating chamber, said air inlet opening means disposed in said air heating plane in alignment with the conical outer surface portions of said array of conical solar energy collectors at the inlet side thereof and extending substantially across the width of said array of solar energy collectors for directing a narrow stream of cold air to said inlet side of said array of solar energy collectors in said air heating chamber and in said air heating plane so as to direct the stream of air into contact with the conical outer surfaces of said conical members, said air outlet opening disposed in said air heating plane in alignment with the conical outer surface portions of said array of conical solar energy collectors at the outlet side thereof and extending substantially across the width of said array of solar energy collectors for conducting a narrow stream of heated air out of the air heating chamber in said air heating plane, means including said air inlet and outlet openings and said array of solar energy collectors for maintaining the air flow in said air heating plane between said inlet and outlet sides of said array of solar energy collectors and for maintaining the flow of air advancing in said air heating plane between the inlet and outlet sides of said array substantially across the entire width of the array of solar energy collectors so that the air flow through said air heating chamber and through said air heating plane contacts essentially only the outer surfaces of said conical members and contacts the outer surfaces of substantially all of said conical members in said array.

* * * * *

UNITED STATES PATENT AND TRADEMARK OFFICE
CERTIFICATE OF CORRECTION

PATENT NO. : 4,223,665
DATED : September 23, 1980
INVENTOR(S) : Leonard A. Lowe

It is certified that error appears in the above-identified patent and that said Letters Patent are hereby corrected as shown below:

In column 6, line 10, after the word "cover" and before the word "into", please add the word --and--.

Signed and Sealed this

Thirteenth Day of January 1981

[SEAL]

Attest:

SIDNEY A. DIAMOND

Attesting Officer

Commissioner of Patents and Trademarks